United States Patent [19]

Verschuere et al.

[11] Patent Number: 5,493,996
[45] Date of Patent: Feb. 27, 1996

[54] DEVICE FOR AUTOMATICALLY CLEANING BIRDS

[75] Inventors: Bruno Verschuere, Palavas; Jean-Pierre Jacques, Allouville-Bellefosse, both of France

[73] Assignee: Elf Aquitaine, Courbevoie, France

[21] Appl. No.: 318,116

[22] Filed: Oct. 5, 1994

[30] Foreign Application Priority Data

Oct. 13, 1993 [FR] France .................... 93 12183

[51] Int. Cl.$^6$ .................... A01K 31/00
[52] U.S. Cl. .................... 119/17; 119/158
[58] Field of Search .................... 119/17, 156, 157, 119/160, 158, 159, 713, 714, 715, 716

[56] References Cited

U.S. PATENT DOCUMENTS

| | | |
|---|---|---|
| 2,347,739 | 5/1944 | Higgins . |
| 3,815,549 | 6/1974 | Opmeer . |
| 4,104,986 | 8/1978 | Dunigan . |
| 4,342,285 | 8/1982 | James ........................ 119/159 |
| 4,478,176 | 10/1984 | James ........................ 119/159 |
| 4,785,836 | 11/1988 | Yamamoto . |
| 5,009,197 | 4/1991 | Cottell ...................... 119/158 X |
| 5,009,197 | 4/1991 | Cottell . |
| 5,088,959 | 2/1992 | Heemskerk ............... 119/159 X |
| 5,211,132 | 5/1993 | Farina et al. .............. 119/158 |
| 5,383,423 | 1/1995 | van der Lely ............. 119/158 |

FOREIGN PATENT DOCUMENTS

| | | |
|---|---|---|
| 2638319 | 10/1988 | France . |
| 1260853 | 5/1963 | Germany . |

*Primary Examiner*—Thomas Price
*Attorney, Agent, or Firm*—Birch, Stewart, Kolasch, & Birch

[57] ABSTRACT

A method and device for cleaning a bird whose plumage has been soiled by pollution are provided, in which the bird is placed in a cage and the bird, with the exception of its head, is subjected to the action of jets of cleaning and rinsing liquid issuing from a plurality of nozzles rotating inside a tank in which said cage is placed.

10 Claims, 3 Drawing Sheets

DEVICE FOR AUTOMATICALLY CLEANING BIRDS

BACKGROUND OF THE INVENTION

1. Field of the Invention

The present invention relates to a method for cleaning birds which have been soiled by various products, and notably by hydrocarbons, as well as to a cage for cleaning the birds and to devices for implementing the method and employing the cage.

The invention finds useful application in ornithological stations or in places where pollution has occurred.

2. Prior Art

The cleaning method most frequently employed is described in an article by G. Bents published in issue 15 of *"L'oiseau magazine"* (1989) and consists in manually washing birds that have been victims of pollution by hydrocarbons using a mixture of hot water and detergent and then washing them with ordinary clean water. This delicate method should only be used by ornithologists. The time needed to clean one bird is between 25 and 60 minutes.

An automatic apparatus for removing pollution from birds is described in French Patent 2,638,319. The apparatus consists of two tanks arranged on different levels the upper tank being provided with means for delivering fixed jets of water oriented respectively downwards at the upper part, sideways at the middle part and vertically at the lower part. The means for delivering the jet of water comprise a wavy pattern of perforated tubes situated in the upper tank, or a double-walled upper tank with perforations on the inner side. The base of the upper tank is perforated to allow water to flow to the lower tank. In the latter, a pump is provided for supplying the jets of the upper tank. The upper tank is covered by a ventilated cover allowing air to be circulated. The bird to be cleaned is placed in the upper tank and subjected to the action of the fixed water jets, including the bird's head.

Between a cleaning and a rinsing operation, the lower tank is manually separated from the upper tank. This apparatus suffers from the following disadvantages:

—there is no provision for keeping the bird in place which means the bird will probably make unexpected movements and get injured during washing, or the bird will tend to lie down with its wings folded, thus making it impossible to clean under the bird's wings. Moreover, in the absence of any system for restraining the bird, it is difficult to recapture the bird in the tank after cleaning, the danger of escape and injury being always present. It is thus extremely difficult to ensure cleaning is done properly.

—the bird's head is in the cleaning zone. When a tired bird is washed for a long period, there is a real danger of drowning.

—recycling of the dirty water by the pump leads to the clean area of plumage becoming polluted, and extends the duration of cleaning. Moreover, the clean water used for rinsing is always polluted by hydrocarbon traces in the lower tank, on the pump and in the piping. It has however been established that effective rinsing requires all hydrocarbon traces to be removed from the bird's plumage.

—the water injection system ("holes" in a coiled pipe) or a double wall is not sufficient to produce jets that are powerful enough to remove patches of hydrocarbon.

—the temperature of the circulated water decreases very rapidly. However, a high temperature is necessary in order to insure good quality cleaning and to keep the bird in a good general state.

—the need to frequently change the water in the lower tank due to its becoming polluted and cooling down rapidly goes against a need to reduce staffing costs and could lead to the pump being damaged or the complete system failing.

—the size of the upper tank needs to be adapted to the size of the bird requiring cleaning. It is consequently necessary to provide a whole set of tanks for treating birds of different sizes.

—in view of the mediocre quality of the cleaning achieved, the birds' plumage is not made impermeable, and the device can only be used for cleaning birds of the *anatidae* species, such as wild ducks or mallards, which live temporarily in water and always provided that the soiling of the feathers is the result of the water being polluted by relatively light hydrocarbon such as domestic heating oil or gas oil. The device is not suitable for dealing with pollution from heavy hydrocarbons such as heavy oils and crude petroleum. For birds of the *alcidae* species (such as guillemots and small penguins) which live permanently on water, their plumage must be cleaned perfectly in order to be impermeable and this cannot be obtained with the prior art device.

U.S. Pat. No. 5,009,197 discloses a method for removing oils from birds and animals. In the method, the bird is successively dipped manually into various tanks containing cleaning fluids agitated by jets supplied by recirculation pumps.

To overcome the difficulties of keeping the creatures in the tank, they are placed in an open mesh cage which leaves them free to move inside the cage. Cleaning of the head and the upper part of the body of the animals is done manually by means of a jet supplied by a cleaning liquid pump.

The method does not enable those parts of the bird that are masked by its wings to be cleaned and requires numerous and delicate manual operation to be carried out. Moreover, a set of different sized cages is needed adapted to the size to the animals to be treated.

SUMMARY OF THE INVENTION

The present invention sets out to overcome the disadvantages of the prior art and notably to provide a device, a cage and a highly effective method of cleaning which requires minimum human intervention.

The birds is properly restrained with his head outside of the cleaning zone, which eliminates risks of injury and drowning.

The use of cleaning liquid at a temperature close to that of the bird's body during the whole operation contributes to the maintenance of the bird's general good state.

The method and device can be employed equally well in ornithological care centers as well as at polluted sites. In the latter case, it is possible to load a set of several devices on board a fully-equipped intervention vehicle.

The invention thus provides a device for cleaning birds with a cleaning liquid comprising a tank, means for pumping said liquid, means for projecting said liquid supplied by said pumping means wherein the means for projecting said liquid comprise at least one movable boom situated inside said tank. According to one additional feature, the device comprises a system for simultaneously driving several booms rotatively about a vertical axis and longitudinally along said same axis.

According to another feature, the device comprises means for removing waste cleaning liquid from the bottom of the tank.

The invention also provides a bird cleaning cage comprising a lateral opening, and fitted with a base the position of which can be adjusted and with a two-part solid cover provided with an aperture and means for spreading the wings of a bird.

The invention also provides a method for cleaning birds employing the device and cage, consisting in placing a bird in the cage and then placing said cage containing the bird in a cleaning tank, said method including at least one cleaning operation or one rinsing operation, said bird being subjected, within said cage, to the action of moveable cleaning liquid jets, the nature of said cleaning liquid varying depending on whether said operation is a cleaning or a rinsing operation.

In one feature of the method, the cleaning liquid is a mixture of water and cleaning agent for the washing operations and is ordinary fresh water for the rinsing operations.

BRIEF DESCRIPTION OF THE DRAWINGS

The invention will be better understood from the description which follows of one embodiment provided by way of example and with reference to the attached drawings.

DETAILED DESCRIPTION OF THE INVENTION

Generally speaking the device and method according to the invention are employed for cleaning sea water and fresh water birds which have been polluted for example by hydrocarbons such as crude petroleum or heavy oils.

Figure 1:
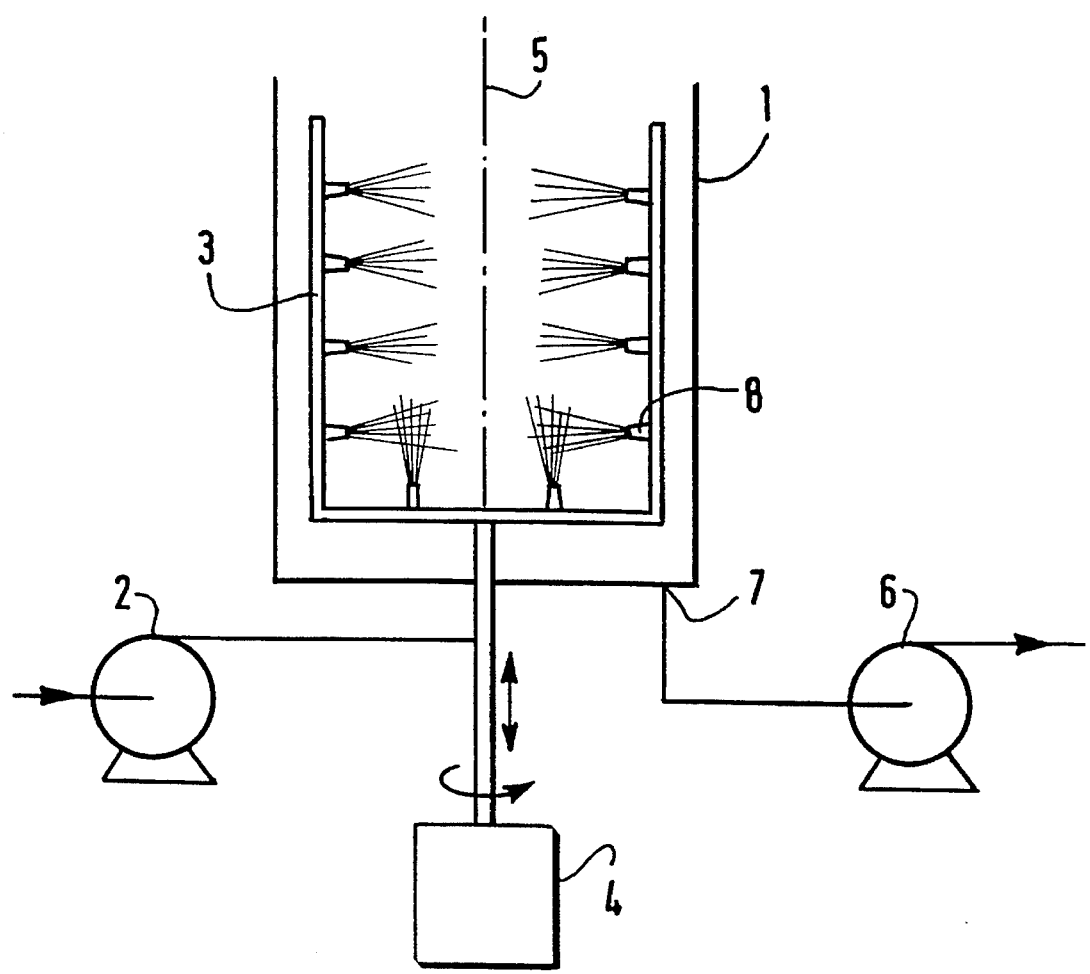
FIG. 1 is a diagrammatic view of the main parts constituting the cleaning device.

In the embodiment shown in FIG. 1, the device comprises:

a cleaning tank 1, means 2 for pumping the cleaning liquid, means 3 for projecting the cleaning liquid, a system 4 for simultaneously driving the liquid projection and cleaning means, providing rotation about axis 5 and longitudinal movement along the same axis, drainage means 6 for removing used cleaning liquid from the bottom of tank 1.

Figure 3:
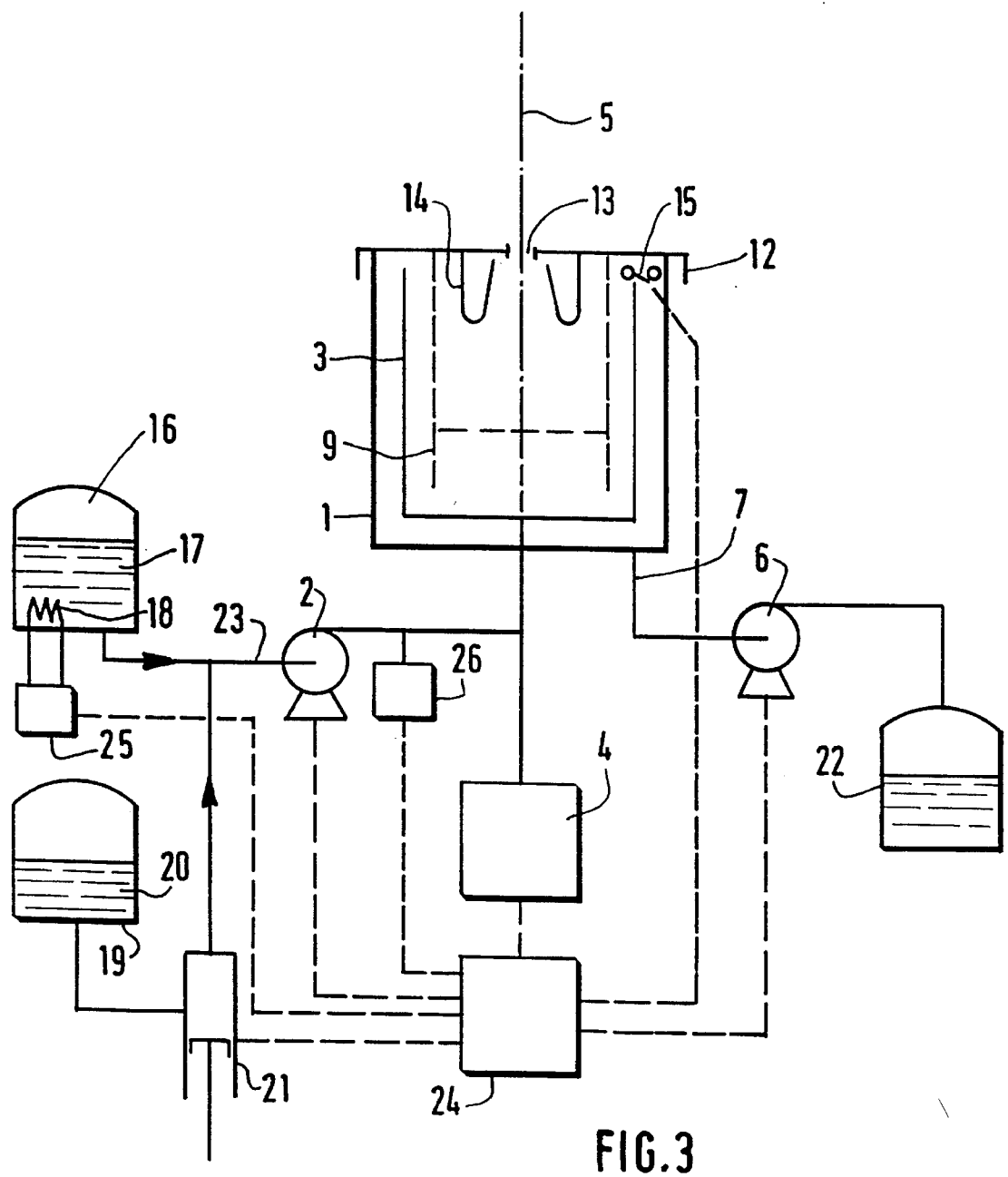
FIG. 3 is a diagrammatic view of the complete cleaning device and the cage.

The device also includes with references to FIG. 3:

a detector 15 for detecting the presence of the cage in the tank 1, a reservoir 16 for fresh water 17, a device 18 for heating the fresh water, means 25 for regulating the fresh water temperature, a reservoir 19 for cleaning agent 20, a means 21 for injecting cleaning agent into the fresh water, a reservoir 22 for receiving used cleaning liquid, a suction pipe 23 for the pumping means 2, a suction pipe 7 for the means 6 for removing used cleaning liquid, electronic and electrical control means 24, and injection and compressed-air production means 26.

The devices also includes, although these are not illustrated, temperatures sensors, reservoir liquid level sensors and liquid flow rate sensors.

The cleaning tank 1 advantageously has a cylindrical shape and is made of a transparent material.

The pumping means 2 for the cleaning liquid can consist of an electric motor driving a centrifugal pump, the suction pipe 23 of which is connected to the fresh water storage tank 16, and the outlet of which is connected to the cleaning liquid projection means 3.

The fresh water 17 is brought up to a temperature close to that of the bird's body by means of heating device 18. The cleaning agent 20 stored in tank 19 is injected into the suction pipe 23 of pumping means 2 by an injection system 21 consisting, for example, of a metering pump connected to the cleaning agent reservoir 19. The means 3 for projecting cleaning liquid comprise at least one, and preferably two, U-shaped spraying booms or members rotatively mounted about the axis of symmetry 5 of the U-shape and able to move longitudinally along the same axis 5, supplied with cleaning liquid from the pumping mean 2. Each boom of means 3 is fitted with a plurality of nozzles producing a flat jet.

Typically, ten nozzles distributed over the horizontal and vertical arms of each boom can be employed. To obtain maximum efficiency of the flat jet, the nozzles 8 are positioned so that, for some, the plane containing the jet passes approximately through the axis 5 of rotation of the boom of means 3, the axes of others being directed upwardly.

The nozzles mounted on the vertical portion of each boom of means 3 are inclined to make an angle of 30° to 60°, preferably 45°, with the vertical portion.

The means 3 for projecting cleaning liquid are driven by the system 4 providing the rotational and longitudinal movement. Typically, the system comprises an electric motor, two pulleys, a belt and two gears providing the rotary movement and a cam and co-operating roller system providing the longitudinal movement.

The alternating linear movement of the cleaning liquid projecting booms of means 3 combined with the orientation of the jets determined by the position of the nozzles 8 on the each boom of means 3 ensures the jets have maximum efficiency. During the ascending phase, the bird's feathers are lifted which enables their lower side to be cleaned. During the descending phase, the action of the jets facilitates removal of pollutant material. To prevent the jets covering the same part of the bird's body during each revolution, the period of the vertical movement differs from the period of the rotary movement. It can for example require 8 revolutions for a nozzle to come back to it original position.

The speed of rotation of the cleaning boom has been determined experimentally and is advantageously comprised between 15 and 40 revolution per minutes and is preferably about 25 rpm.

To avoid the bird suffering a spinning effect, which could be harmful to it, the direction of rotation is automatically reversed every six to 12 revolutions, for example every 8 revolutions.

The pressure of the outlet liquid from pump 2 has been determined experimentally to obtain high jet efficiency and a water consumption comprised between 10 and 30 liters/ minute. The pressure is comprised between 2 and 5 bar for example 4 bar, in the case of projecting means comprising one boom and ten nozzles. Moreover, it is possible to inject compressed air into the cleaning liquid using compressed air producing and injecting means 26, the effect of which is to facilitate lifting of the bird's feathers. The temperature of the water 17 in storage tank 16 is regulated by regulation means 25 acting on heating device 18. The temperature is set at a value close to the temperature of the body of the bird to be cleaned, and is between 30° and 50° C., for example 41° C. for a guillemot. This value additionally ensures the cleaning agent works effectively.

The means 6 for eliminated the cleaning liquid consist of an electric motor driving a centrifugal pump with its suction pipe 7 going to the bottom of the tank 1. The pump sucks up used cleaning liquid from the bottom of the tank 1 and pumps it into a reservoir 22.

The electronic and electrical control means 24 additionally comprising, typically, a programmable controller and a control display panel, are connected to the detector 15, such as a microswitch, for detecting the presence of the cage in the tank 1, to the means 2 for pumping the cleaning liquid, to the means 6 for eliminating used cleaning liquid, to a system 21 for injecting cleaning agent, to means 25 for regulating the temperature of the fresh water in storage tank 16, to the means 26 for injecting compressed air and finally to the system 4 driving the cleaning liquid projecting means.

After detecting that the tank is present in the cage, the electronic and electrical control means start up the pumping means 2, the cleaning liquid removal means, the air injection means 26, the cleaning liquid injection means 21 during the washing phases. The control means 24 also control the drive means 4 for the cleaning liquid projecting means 3, issuing instructions to reverse the direction of rotation every 8 revolutions.

The control means 24 ensure the cleaning operation follows the correct sequence followed by rinsing and stopping of the various parts of the device at the end of the operation.

The control means 24 supply the temperature regulating means 25 with a target value for temperature of the water 17. The various sensors supply the programmable controller with information on the progress of operations and can terminate them if a fault is detected such as a lack of water or cleaning agent, or an excessive level of liquid in tank 1 or in reservoir 22, for example.

The control and display panel provides information about the progress of the operations and enables operating parameters to be modified, for example the duration of the various cleaning phases, the speed of rotation of the projection booms and the water temperature.

At the end of the operation, the quality of cleaning of the bird can be checked thanks to the transparency of the tank. The bird's plumage should be devoid of patches, and drops of water should form spheres on well puffed-up and spread feathers. The power of the flat jet obtained from the nozzle under the indicated conditions is adequate for detaching patches of hydrocarbon. It is far superior to that obtained from jets obtained from holes in a coiled pipe or the inner housing of a double-walled cleaning tank.

The temperature regulating means insure that the water temperature stays constant during the complete cleaning operation.

The device does not include means for recycling soiled water. Thanks to the use of cleaning liquid removal means, the cleaning liquid projecting and pumping means are never in contact with hydrocarbon. This feature of the device ensures particularly effective rinsing, which is necessary in order for all traces of hydrocarbon to disappear.

With the device disclosed, no assembly or removal steps are necessary on the device during the cleaning and rinsing operations. All the operations are automated.

Figure 2:
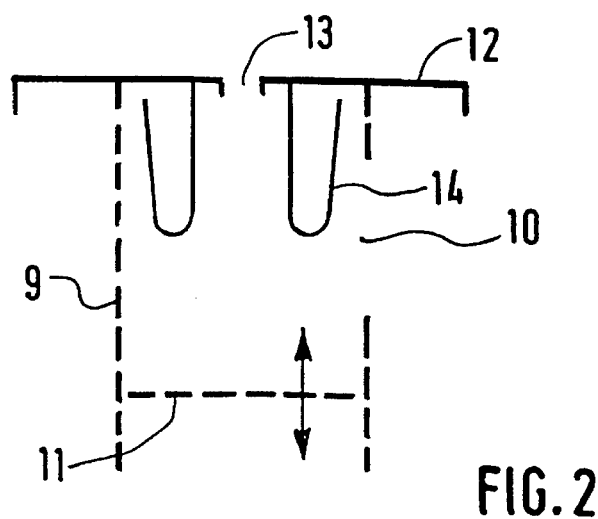
FIG. 2 is a diagrammatic view of the cleaning cage.

The device described above is accompanied by a cage shown in FIG. 2, in which the bird is placed. The cage comprises:

an open mesh body 9 having a lateral opening 10, a variable-height base 11, a two-part solid cover 12, one of the parts being moveable, the cover including an aperture or opening 13, means 14 for spreading the wings of the birds.

The cage further comprises the following which are not shown in the drawings:

means for guiding the base while its position is being set, means for locking the base in position, means for locking the moveable part of the cover to the fixed part, a handle fastened to the fixed part to the cover.

The open mesh body 9 and the bottom 11 of the cage are constructed so as to offer minimum resistance to the cleaning liquid jet. For example, welded 2 mm diameter stainless steel wire is perfectly suitable. The solid cover 12 of the cage can be made of sheet metal.

The means 14 for spreading the bird's wings typically consist of pivoting hooks fastened to the fixed part of the cover.

The lateral opening 10 enables the bird to be introduced into the cage. Adjusting the position of the bottom of the cage enables its size to be adapted to the size of the bird to be cleaned. Adjustment should be done so that the bird's feet rest on the bottom 11 of the cage with the bird's head projecting above the cover 12, its neck passing through the aperture 13. The bottom 11 is locked at the selected position by a locking element.

Introduction of the bird into the cage is facilitated by the fact that the cover 12 has a movable part, and that the wing retaining hooks 14 pivot. When the bird is in position, the moveable half of the cover is closed and locked to the fixed part by fastening means.

The cage disclosed can be used for cleaning birds of various sizes thanks to the presence of the adjustable bottom. Moreover, the pivoting hooks in which the bird's wings are placed ensure the bird is restrained with its wings open which prevents it making disorganized movements, the whole of the bird's body surface being exposed, which also enables the quality of cleaning to be easily checked.

The bird's head is kept outside the automatic cleaning zone which avoids the danger of drowning in the case of an overly long washing of a fatigued bird. Moreover, as the bird is immobilized, manual washing of the head can be carried out if necessary during the automatic washing operation.

It can be seen that the device and the cage are perfectly suitable for cleaning birds in specialised treatment centers as well as on polluted sites. To intervene on polluted sites, several devices and cages can advantageously be loaded onto a completely fitted-out intervention vehicle enabling a large numbers of birds to be treated.

In both cases, several cages can be provided for keeping soiled birds during the current automatic cleaning operation.

The present invention also discloses a method for operating the cleaning device described above.

In the method, the operator adjusts the position of the bottom of the cage as a function of the bird, and then introduces the bird into the cage. Having removed the detachable part of the cover, the operator places the bird's neck in the specially-shaped part of the fixed half of the cover, constituting half of the aperture 13, and then places the wings in the spreading means 14.

After this, the operator places the cage containing the immobilized bird in the cleaning tank 1, where it is automatically subjected to the action of the moving jets of cleaning liquid. The nature of the cleaning liquid differs depending on whether it is a question of eliminating soiling of the bird or eliminating the cleaning liquid, and the last traces of soiling after a washing operation.

According to a further features of the method, the cleaning liquid is a mixture of water and cleaning agent in a proportion of 1 to 5% and preferably 3% for cleaning operations and is ordinary clean water for the rinsing operations.

Figure 4:
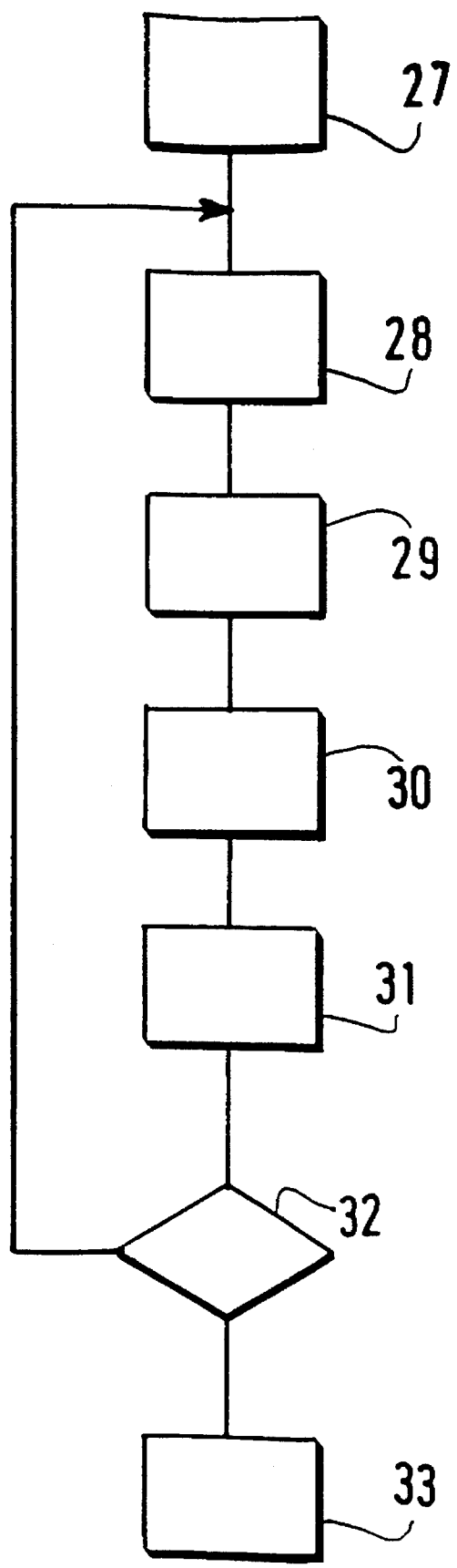
FIG. 4 is a flow chart showing the sequence of steps of the cleaning operation.

According to another characteristic, the invention provides a sequential method for cleaning birds. The sequence illustrated in FIG. 4, which has given good results, will now be described.

The sequence comprises:

a phase 27 consisting in placing the bird in the cage, and the cage containing the bird in the cleaning tank, a cleaning phase 28 lasting about 40 seconds a rinsing phases 29 lasting about 40 seconds a washing phase 30 lasting about 40 seconds a final phase 31, lasting about 80 seconds a visual inspection phase 32 for the quality of cleaning.

In the case of an extremely dirty bird, the operator can optionally repeat phases 28 to 31. If cleaning is correct, the next phase is executed.

The last phase 33 consists of automatically stopping the device and manually removing the cage from the tank. After this, the bird can be released.

The values for the duration of the various operations and sequences are provided by example and can be adapted to the degree and nature of the soiling of the bird.

In the example described, the time needed to clean a bird is about 4 minutes.

As the manual operations are limited to introducing and removing the bird, one single operator can supervise the simultaneous cleaning of several birds, for example inside a vehicle in which several devices are mounted.

What is claimed is:

1. A device for cleaning birds with a cleaning liquid comprising a tank, a reservoir for storing the cleaning liquid, means for pumping the cleaning liquid from said reservoir, means for projecting the cleaning liquid supplied by said pumping means, wherein said means for projecting the cleaning liquid include at least one spraying member movable inside said tank, and said tank and projection means are arranged whereby an upper opening and a central portion of said tank are left free to accommodate a bird cleaning cage.

2. The device according to claim 1 wherein said means for projecting the cleaning liquid include a plurality of spraying members and means for driving said plurality of spraying members simultaneously rotatively about a vertical axis and longitudinally along said vertical axis.

3. The device according to claim 1 further comprising means for removing projected cleaning liquid from the bottom of said tank.

4. A device according to claim 2 further comprising means for removing projected cleaning liquid from the bottom of said tank.

5. A device for cleaning birds with a cleaning liquid comprising a tank including a central portion and a first end having an opening, a reservoir for storing the cleaning liquid, means for pumping the cleaning liquid from said reservoir, means for projecting the cleaning liquid supplied by said pumping means, wherein said means for projecting the cleaning liquid include at least one spraying member disposed within said tank and movable relative thereto, and each of said at least one spraying member has a U-shaped portion with the open end thereof extending from said central portion toward said opening.

6. The device according to claim 5 wherein said means for projecting the cleaning liquid include a plurality of spraying members and means for driving said plurality of spraying members simultaneously rotatively about a first axis and longitudinally along said first axis.

7. The device according to claim 6 wherein at least one of said plurality of spraying members has a plurality of nozzles, a first portion of said plurality of nozzles being disposed on one or the other of the arms of the U-shaped portion, the space between the arms being unobstructed.

8. The device according to claim 5 further comprising means for removing projected cleaning liquid from the bottom of said tank.

9. The device according to claim 6 further comprising means for removing projected cleaning liquid from the bottom of said tank.

10. The device according to claim 7 further comprising means for removing projected cleaning liquid from the bottom of said tank.

* * * * *